United States Patent [19]

Anastassiou et al.

[11] Patent Number: 4,504,864

[45] Date of Patent: Mar. 12, 1985

[54] NONLINEAR FILTERING OF GRAY SCALE IMAGES

[75] Inventors: Dimitris Anastassiou, Long Island City; William B. Pennebaker, Carmel, both of N.Y.

[73] Assignee: International Business Machines Corporation, Armonk, N.Y.

[21] Appl. No.: 454,783

[22] Filed: Dec. 30, 1982

[51] Int. Cl.³ .............................................. H04N 5/21
[52] U.S. Cl. ...................................... 358/167; 358/36
[58] Field of Search ............... 358/167, 166, 163, 36, 358/213; 382/54; 328/158, 165, 167

[56] References Cited
U.S. PATENT DOCUMENTS 4,305,091 12/1981 Cooper ............................... 358/167

Primary Examiner—John C. Martin
Assistant Examiner—Victor R. Kostak
Attorney, Agent, or Firm—George E. Clark; Jack M. Arnold

[57] ABSTRACT

Apparatus and method are described for filtering noise from digital video images including means for determining first difference values between intensity values of current pel and one or more preceding pels, means for determining second difference values between intensity values of the current pel and one or more succeeding pels, means for limiting any of the first and second difference values that exceed a predetermined limit value, and means for generating a filtered value for the current pel by adding the intensity value of the pel to a scale summation of the limited first and second difference values.

9 Claims, 5 Drawing Figures

Table I

```
0001 0203 0405 0607 0809 0a0b 0c0d 0e0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
0f0f 0f0f 0f0f 0f0f 0f0f 0f0f 0f0f 0f0f
```

```
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f1f1  f1f1  f1f1  f1f1  f1f1  f1f1  f1f1
f1f1  f2f3  f4f5  f6f7  f8f9  fafb  fcfd  feff
```

FIG. 3.2

NONLINEAR FILTERING OF GRAY SCALE IMAGES

BACKGROUND OF THE INVENTION

1. Field of the Invention

The present invention relates to image processing systems and more particularly to apparatus and methods for filtering low amplitude texture and noise from video images.

2. Description of the Prior Art

In the prior art there are many image processing systems. The following are systems representative of the prior art.

A paper entitled "Adaptive Prefiltering for NTSC Composite Color Television Interfield Coding" was presented in the June 1981 Picture Coding Symposium by Sawada el al which teaches a nonlinear filter for image data in which a smoothing coefficient is generated from a difference signal such that the smoothing coefficient is set to zero for differences equal to or greater than a predetermined threshold and the smoothing coefficient is not modified for difference values less than the predetermined threshold.

The method and apparatus shown in the paper present a significant problem in that the smoothing coefficient is reduced to zero when a difference value exceeds a predetermined threshold which causes significant discontinuities in the filtered signal.

U.S. Pat. No. 4,121,248 discusses a streak reduction system for forward looking infrared systems employing an analog circuit apparatus for sampling, holding, integrating and comparing delayed signals to reduce streaks.

The patent does not show the digital apparatus or method according to the present invention.

U.S. Pat. No. 4,298,895 describes a method of noise elimination in a video image by counting a number of white picture elements among a group of picture elements surrounding a picture element to be acted upon and modifying the picture element value, when the number of white picture elements in the surrounding area exceeds a predetermined level, to the majority color value such as white and setting the current picture element to the minority color value such as black when the number of white elements in the surrounding area is less than a predetermined level. Alternatively, the value of the current picture element is set to the majority color value when the proportion is greater than a first predetermined level and is set to the color value of a minority color when the number of majority color picture elements is less than a second predetermined value and unmodified when the number of majority color value picture elements in the surrounding area is between the first and second predetermined levels.

The noise elimination method of the patent does not determine a difference value between intensity levels of a current picture element and one or more preceding picture elements and a difference value between a current picture element and one or more succeeding picture elements. Further, the method of the current patent does not show the generation of a filtered value for the current picture element by adding intensity values of the current picture element to a constant times a sum of limited first and second difference values.

U.S. Pat. No. 4,268,864 shows an image enhancement system for television signal wherein a first fractional amplitude portion of a generated detail signal is amplified and subjected to severe coring and a resulting bipolar signal is combined with a second fractional amplitude portion of the generated detail signal to produce a resultant detail signal having a contour which reduces the width of the edging effect at contrast transitions associated with conventional enhancement systems and in which high frequency noise and other spurious signals are substantially reduced while retaining fine detail.

Although the patent generally teaches image enhancement employing comparison of fractional portions of the generated detail signal in a video image to filter noise, the patent does not relate to a nonlinear filter for filtering noise in a digital video image by comparing values of current and preceding and succeeding picture elements to generate difference signals which are then employed to filter noise from the video image by adjusting value of the current picture element.

U.S. Pat. No. 4,228,465 shows a linear convolution filter which filters a current pixel value based upon values of pixels in a surrounding matrix.

The patent does not teach a nonlinear filter such as is taught and claimed by the present invention.

U.S. Pat. No. 4,242,705 teaches a recursive noise reduction system for a real time television system which employs a method of generating a noise signal which is subtracted from an incoming video signal to produce a noise reduced output signal for display.

The patent does not teach a nonlinear filter which reduces noise and smooths video images by adding limited difference signals generated from preceding and succeeding picture elements in an image to an original value of the current picture element to produce an essentially noise free picture element value.

SUMMARY OF THE INVENTION

Therefore, it is an object of the present invention to reduce noise in digital image data through the use of a nonlinear filter which filters noise from image and data by determining differences between a current picture element and one or more preceding picture elements and one or more succeeding picture elements, establishing a limit value for the difference based upon predetermined criteria, limiting any difference value that exceeds the limit and generating a filtered value for the current picture element by adding the intensity value of the current picture element to a constant multiplied times the sum of the limited difference values.

It is another object of the present invention to filter digital image data as above wherein preceding and succeeding picture elements on the same scan line are employed to determine the difference values.

It is another object of the present invention to filter digital image data as above wherein data from preceding and succeeding scan lines are used to determine difference values.

It is yet another object of the present invention to filter noise from digital image data through the use of apparatus including a plurality of picture elements storage devices, a plurality of circuits for subtracting intensity value of a current pel from preceding and succeeding pels, one or more look-up tables whose input are the difference values and whose output are the limited difference values established in accordance with a predetermined limit and one or more adders for adding the normalized difference intensity values to the intensity value of the current pel to generate a filtered intensity value for the current pel.

Accordingly, apparatus and method for filtering noise from digital video images includes means for determining a first difference value between intensity values of a current pel and one or more preceding pels, determining a second difference value between intensity values of the current pel and one or more succeeding pels, limiting any of the first or second difference values that exceed a predetermined limit value and generating a filtered value for the current pel by adding the intensity value of the pel to a scaled summation of the limited first and second difference values.

The method and apparatus of the current invention improves noise filtering and leads to improved compression and image quality. The current invention further eliminates correlation problems between successive raster lines which may cause ragged edges in the vertical lines.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 3 shows the relationship between FIG. 3.1 and FIG. 3.2.

FIGS. 3.1 and 3.2 is a table showing the transfer function of the difference value limiting look up table according to the present invention.

In the drawing, like elements are designated with similar reference numbers, and identical elements in different specific embodiments are designated by identical reference numbers.

DESCRIPTION OF A PREFERRED EMBODIMENT

An embodiment of the present invention will be described below which provides nonlinear filtering of image data to improve compression and image quality and to extensions of the embodiments to scale filter properties with the properties of human vision.

There are of course many noise filters available in the prior art. The linear filters which are known generally correct the intensity value of a pel by circulating a weighted average of the pel intensity value with its nearest neighbors. However, the linear filter degrades large video excursions as much as small excursions causing significant problems with sharp edges in an image. This problem can be avoided by introducing nonlinearity.

The following equations show how a filtered intensity value for a current pel is calculated in a nonlinear filter:

$$V_{nf} = V_n + \tfrac{1}{4}(\Delta_{n-1} + \Delta_{n+1}) \qquad 1$$

where $$\Delta_{n-1} = (V_{n-1} - V_n)$$

$$\Delta_{n+1} = (V_{n+1} - V_n)$$

and where the nonlinearity is introduced by the constraint:

$$\Delta'_{n\pm 1} = \Delta_{n\pm 1} \text{ if } |\Delta_{n\pm 1}| \leq L$$

$$\Delta'_{n\pm 1} = 0 \text{ if } |\Delta_{n\pm 1}| < L \qquad 2$$

where L is a limit determined by the signal to noise ratio or empirical testing. This nonlinear filter described by the above equations (2) is the basic form of nonlinear filters found in the prior art. The performance of the filter can be improved by the modification contained in the present invention.

A problem occurs whenever the change, $\Delta_{n\pm 1}$, is close to the limit L. Since there is strong correlation between successive raster lines, if on one line limiting process is invoked and on the next line it is not, vertical lines may become ragged and less predictable from line to line. Consequently, image quality and compression may be reduced.

Figure 1:
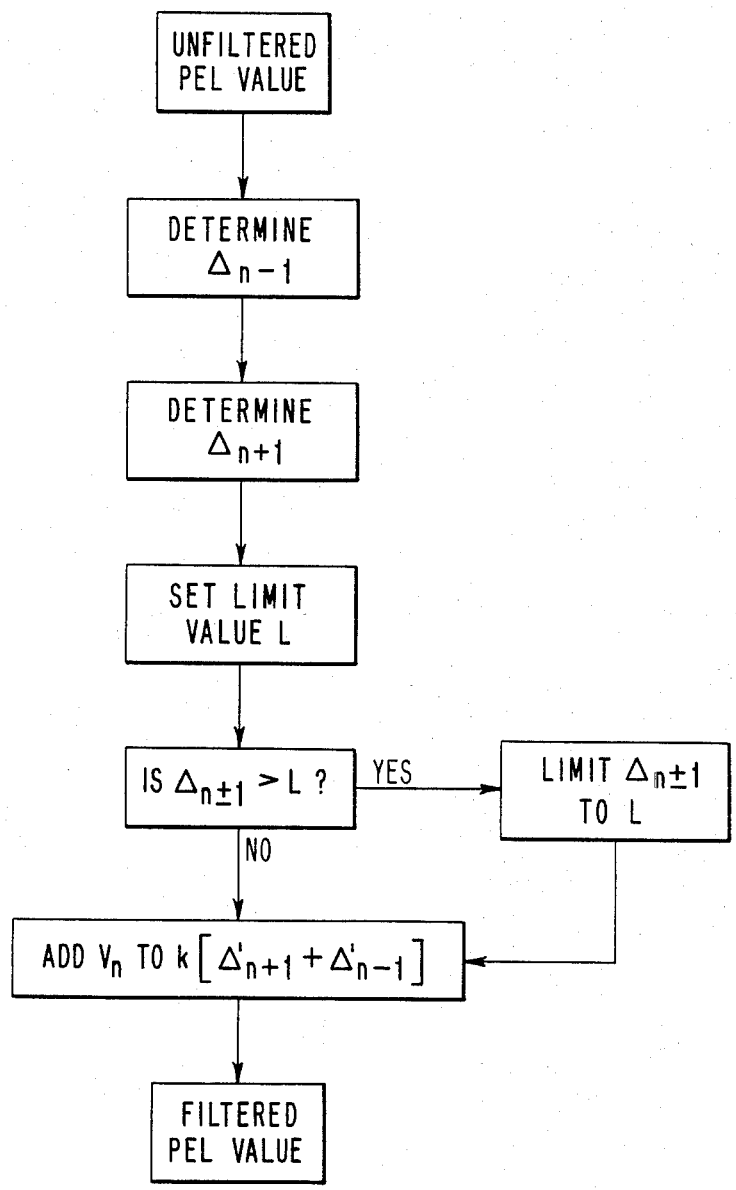
FIG. 1 is a flow chart of the method of filtering video image data according to the present invention.
Figure 2:
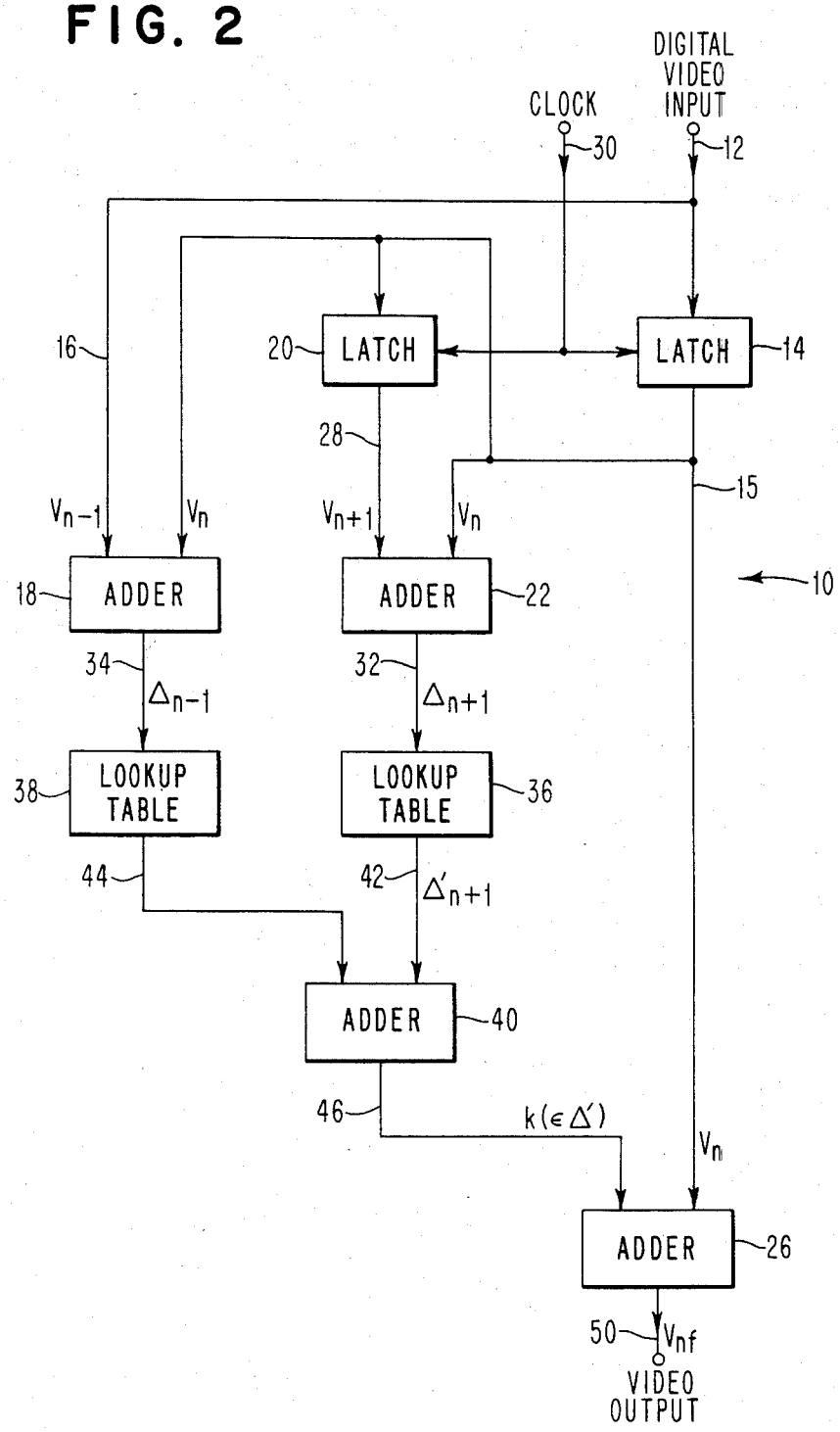
FIG. 2 is a block diagram of apparatus for filtering video image data according to the present invention.

The method of the present invention as shown in the flowchart in FIG. 1 and the apparatus of a preferred embodiment of the invention as shown in the circuit diagram of FIG. 2, reduces the problems inherent in the prior art nonlinear filters discussed above. The filter equations are modified as follows:

$$V_{nf} = V_n + \tfrac{1}{4}(\Delta'_{n-1} + \Delta'_{n+1}) \qquad 3$$

where $$\Delta'_{n\pm 1} = \Delta_{n\pm 1} \text{ if } |\Delta_{n\pm 1}| \leq L \text{ (as above)} \qquad 4(a)$$

and $$\Delta'_{n\pm 1} = L \text{ if } |\Delta_{n\pm 1}| > L \qquad 4(b)$$

In this form, the filtering process continues through regions of high amplitude variations or gradients without significant loss of sharp edges, and without loss in quality of vertical edges.

In addition, data compression has been improved by approximately 8% in a random sample of images.

Referring now to FIG. 1, the flowchart of a preferred embodiment of the method according to the present invention, the inventive method will be described.

Unfiltered image data $V_n$ is provided as an input to the nonlinear filter according to the present invention. A first difference $\Delta_{n-1}$ is determined by subtracting the intensity value of current pel $V_n$ from the intensity value of a previous pel $V_{n-1}$. A second difference value $\Delta_{n+1}$ is similarly determined by subtracting the intensity value of current pel $V_n$ from the intensity value of a succeeding pel $V_{n+1}$.

A limiting value L which has been predetermined based upon empirical information is then set and compared to first and second difference values $\Delta_{n-1}$ and $\Delta_{n+1}$. If the difference value $\Delta_{n\pm 1}$ is not greater than L, no modification is made to the value of $\Delta_{n\pm 1}$.

If, however, difference value $\Delta_{n\pm 1}$ is greater than L, the value of $\Delta'_{n\pm 1}$ is limited to the limit value L. The limit function can be accomplished through the use of a look up table, such as is shown in FIGS. 3.1 and 3.2, where the input is $\Delta_{n\pm 1}$ and the transfer function of the look up table is that set out above with respect to equations 4(a) and 4(b) to achieve a limited difference out $\Delta'_{n\pm 1}$.

The filtered intensity value of the current pel $V_{nf}$ is then generated by adding the original intensity value of the current pel $V_n$ to $\tfrac{1}{4}$ the sum of the limited difference values $\Delta'_{n-1}$ and $\Delta'_{n+1}$.

Although the embodiment of the method has been described with respect to differences between a current pel and nearest neighbor pels, it is well within the ability of a person skilled in the art to extend the method to multiple neighbor pels employing the following equation:

$$V_{nf} = V_n + \frac{1}{2m} \sum_{i=-m}^{i=m} A_i \Delta_{n+i} \qquad 5.$$

where $$A_i = 1 \text{ for } -m < i < +m$$

and $$A_i = \tfrac{1}{2} \text{ for } i = \pm m.$$

It should be noted, that for $m=1$, the method decribed above with respect to equation (3) and FIG. 1 results.

It should also be recognized that extensions to two dimensions are well within the skill of the art since the entire digital video image is mapped into an image storage and can be accessed in any manner required for calculation. However, no significant improvement in compression has been found from the use of a two dimensional nearest neighbor nonlinear filter when compared to the improvement obtained from the one dimensional filter described herein.

The apparatus according to the present invention embodied in FIG. 2 will now be described as one implementation to execute the method described above. A digital video input data stream appears on line 12 which is connected as inputs to latch 14 and to a first input 16 of adder 18. Latch 14 provides on line 15 inputs to latch 20, adder 22, adder 18 and adder 26. Latch 20 provides an output on line 28 to a second input to adder 22. Clocline 30 provides clock pulses at the rate of 1 per picture element. Latch 14 and latch 20 each store a single picture element.

If line 12 represents $V_{n-1}$ a succeeding pel, the output of latch 14 on line 15 will represent the current pel $V_n$ and the output of latch 20 on line 28 will represent a preceding pel $V_{n+1}$. Therefore, inputs to adder 22 are the values of the current pel n and the preceding pel n+1 which are then subtracted by adder 22 to produce difference $\Delta_{n+1}$ on adder output 32. Similarly, line 15 to adder 18 represents the intensity value of the current pel n and input 16 to adder 18 has represented the intensity value of pel n−1. Adder 18 through a subtraction operation produces difference $\Delta_{n-1}$ on adder output line 34.

Difference $\Delta_{n+1}$ on line 32 and $\Delta_{n-1}$ on line 34 address read only storage look up tables 36 and 38 respectively. The transfer function of read only storage look up tables 36 and 38 are shown in FIGS. 3.1 and 3.2 which clearly indicates the point at which the limit value L is substituted for the value of $\Delta_{n\pm1}$ as the value of $\Delta_{n\pm1}$ exceeds L. The limited difference value $\Delta'_{n+1}$ appears on line 42 which is the output of look up table 36 connected to a first input of adder 40. Limited difference value $\Delta'_{n-1}$ which is the output of look up table 38 appears on line 44 as a second input to adder 40.

In accordance with equation (3) above, adder 40 adds the difference values $\Delta'_{n-1}$ and $\Delta'_{n+1}$ and then a multiplication is performed on the sum by a factor of $\tfrac{1}{4}$, which product then appears on the output 46 of adder 40 which is connected to a second input of adder 26.

Adder 26 adds the intensity value of the current pel $V_n$ which appears on line 15 to the adjusted value of the sum of limited differences which appears on line 46 to produce a filtered intensity value for the current pel $V_{nf}$ on output line 50.

Although the preferred embodiment of the present invention described above has been set out with respect to method and apparatus for reducing noise and low amplitude texture in images to improve compression and image quality, the one dimensional filter described above has been found to improve vertical texture and eliminate noise in the following two applications.

In post-processing, horizontal streaks left in the decompressed gray scale images may be removed by a vertical nonlinear filter according to the present invention.

Secondly, a nonlinear filter according to the present invention may be used for preprocessing to remove or suppress sawtooth edges in graphic images thresholded to one or two bits per pel. Timing jitter and/or camera vibration can cause shifts of small amplitude between two fields of a captured image. If the threshold falls between the shifts in amplitude, the resulting edge has a sawtooth character which is undesirable. This reduces both data compression and image quality. Employing a vertical one dimensional nonlinear filter greatly reduces this sawtooth effect.

Thus, while the invention has been described with reference to preferred embodiments thereof, it will be understood by those skilled in the art that various changes in form and details may be made without departing from the scope of the invention.

What we claim as new and desire to secure by Letters Patent is:

1. A method of nonlinear filtering of video images having a plurality of pels, wherein each said pel is represented by a gray scale signal having one or more bits, comprising the steps of:
    determining first difference values between intensity values of a current pel and one or more preceding pels;
    determining second difference values between intensity values of said current pel and one or more succeeding pels;
    limiting said first and second difference values so that they do not exceed a predetermined limit value;
    generating a filtered value for said current pel by adding said intensity value of said current pel to a sum of said limited difference values each multiplied by a predetermined constant.

2. A method according to claim 1, wherein said constant is a normalizing factor determined by the number of pels sampled to determine said difference values.

3. A method according to claim 1, wherein said limiting step further comprises the step of setting any of said difference values that exceed said limit value to said limit value.

4. A method according to claim 1, wherein said steps of determining difference values samples only a preceeding and a succeeding pel immediately adjacent to said current pel.

5. Apparatus for nonlinear filtering of digital video images having a plurality of pels, wherein each said pel is represented by a gray scale signal having one or more bits, comprising:
    means for determining first difference values between intensity values of a current pel and one or more preceding pels;

means for determining second difference values between intensity values of said current pel and one or more succeeding pels;

means for limiting said first and second difference values so that they do not exceed a predetermined limit value;

means for generating a filtered value for said current pel by adding said intensity value of said current pel to a constant times a sum of said limited first and second difference values.

6. Apparatus according to claim 5, wherein said means for limiting comprises one or more look up tables for providing a limited output value in response to an input value which exceeds said limit value.

7. Apparatus according to claim 5, further comprising one or more storage devices for storing one or more intensity values of pels in a sequence of pels.

8. Apparatus according to claim 5, wherein said means for generating a filtered value for said current pel further comprises one or more adders to combine limited difference values with an intensity value of said current pel to produce a filtered value for said current pel.

9. Apparatus according to claim 5, wherein said means for determining difference values comprises one or more adders for producing difference values in response to intensity values of said current pel and said preceeding and succeeding pels.

* * * * *